US008941337B2

United States Patent
Uryu et al.

(10) Patent No.: US 8,941,337 B2
(45) Date of Patent: Jan. 27, 2015

(54) MOTOR DRIVING DEVICE AND ELECTRIC POWER STEERING APPARATUS INCLUDING MOTOR DRIVING DEVICE

(71) Applicant: Denso Corporation, Kariya, Aichi-pref. (JP)

(72) Inventors: Nobuhiko Uryu, Kariya (JP); Naoki Matsuda, Handa (JP); Yoshihide Kuroda, Obu (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 13/965,301

(22) Filed: Aug. 13, 2013

(65) Prior Publication Data
US 2014/0055059 A1 Feb. 27, 2014

(30) Foreign Application Priority Data
Aug. 27, 2012 (JP) .................. 2012-186541

(51) Int. Cl.
*B60K 6/36* (2007.10)
*H02K 7/10* (2006.01)
*H02P 27/06* (2006.01)
*H02M 7/48* (2006.01)
*B62D 5/04* (2006.01)

(52) U.S. Cl.
CPC .............. *H02P 27/06* (2013.01); *H02M 7/48* (2013.01); *B62D 5/0484* (2013.01); *B62D 5/0487* (2013.01)
USPC ...... 318/9; 318/139; 318/400.21; 318/400.22; 318/790; 318/801

(58) Field of Classification Search
CPC ..... H02H 7/08; H02H 7/0844; B62D 5/0481; B62D 5/0487; H02K 11/0073; H02P 29/021
USPC ............ 318/9, 139, 400.21, 400.22, 790, 801
See application file for complete search history.

(56) References Cited

U.S. PATENT DOCUMENTS

| 8,169,174 | B2 * | 5/2012 | Shibata ................... 318/434 |
| 8,499,885 | B1 * | 8/2013 | Satou et al. .............. 180/446 |
| 8,698,435 | B2 * | 4/2014 | Tada ...................... 318/400.21 |
| 2011/0163708 | A1 | 7/2011 | Mukai et al. |
| 2012/0286594 | A1 | 11/2012 | Miyaki et al. |
| 2013/0307129 | A1 * | 11/2013 | Fujita et al. ............. 257/666 |

OTHER PUBLICATIONS

Uryu, et al., U.S. Appl. No. 13/965,266, filed Aug. 13, 2013.

* cited by examiner

*Primary Examiner* — Erick Glass
(74) *Attorney, Agent, or Firm* — Nixon & Vanderhye PC

(57) ABSTRACT

In a motor driving device, a first relay portion is connected between a power source and an inverter portion, a second relay portion is connected between the first relay portion and the inverter portion, and a motor relay portion is connected between the inverter portion and a winding group of a motor. Inverter pre-driver circuits respectively drive switching elements of the inverter portion. A first pre-driver circuit drives the first relay portion. A second pre-driver circuit drives the second relay portion and the motor relay portion. A controller controls driving of the inverter portion, the first relay portion, the second relay portion, and the motor relay portion, and detects a failure of the first relay portion, the second relay portion, and the motor relay portion.

6 Claims, 5 Drawing Sheets

MOTOR DRIVING DEVICE AND ELECTRIC POWER STEERING APPARATUS INCLUDING MOTOR DRIVING DEVICE

CROSS REFERENCE TO RELATED APPLICATIONS

The present application is based on and claims priority to Japanese Patent Application No. 2012-186541 filed on Aug. 27, 2012, the contents of which are incorporated in their entirety herein by reference.

TECHNICAL FIELD

The present disclosure relates to a motor driving device and an electric power steering apparatus including the motor driving device.

BACKGROUND

Conventionally, a motor driving device including a plurality of switching elements is known. For example, JP-A-2011-142744 (corresponding to US 2011/163708 A1) discloses a motor driving device that includes a plurality of switching elements and a power source relay. The switching elements form a motor driving portion. The power source relay cuts off power supply to the motor driving portion when a failure occurs in the motor driving device. The switching elements and the power source relay are driven through pre-driver circuits.

In a case where a semiconductor device having a parasitic diode, such as a metal-oxide semiconductor field-effect transistor (MOSFET), is used for the power source relay, in order to protect a circuit in case the power source is incorrectly connected in reverse polarity, a reverse connection protection relay may be disposed such that a parasitic diode of the reverse connection protection relay is connected in an opposite direction.

In a case where a motor is applied to an electric power steering apparatus and a steering wheel is directly connected to the motor, an induced voltage is generated in the motor when the steering wheel is operated by a driver. When a failure of the motor occurs and the power source relay is turned off, the induced voltage generated due to a steering operation by the driver is applied to a closed circuit formed between an inverter portion and a winding group. When the induced voltage is applied to the closed circuit formed between the inverter portion and the winding group in a state where the power source relay is in off-state, electric current may flow to the closed circuit to generate a brake torque and the driver may feel uncomfortable. Thus, a motor relay that is capable of cutting off an electrical connection between the winding group and the inverter portion may be disposed so that the closed circuit is not formed between winding group and the inverter portion when a failure of the motor occurs.

The switching elements and the relays may be driven through the pre-driver circuits. However, JP-A-2011-142744 does not disclose a detail of the pre-driver circuits. Although pre-driver circuits may be provided respectively to the switching elements and the relays, a size of the motor driving device may increase.

SUMMARY

An object of the present disclosure is to provide a motor driving device having a small size. Another object of the present disclosure is to provide an electric power steering apparatus including the motor driving device.

A motor driving device according to an aspect of the present disclosure includes an inverter portion, a first relay portion, a second relay portion, a motor relay portion, a plurality of inverter pre-driver circuits, a first pre-driver circuit, a second pre-driver circuit, and a controller. The inverter portion includes a plurality of switching elements that switches power supply to a winding group of a motor. The first relay portion is connected between a power source and the inverter portion. The second relay portion is connected between the first relay portion and the inverter portion. The motor relay portion is connected between the inverter portion and the winding group of the motor. The inverter pre-driver circuits respectively drive the switching elements of the inverter portion. The first pre-driver circuit drives the first relay portion. The second pre-driver circuit drives the second relay portion and the motor relay portion. The controller includes a control section and a failure detecting section. The control section controls driving of the inverter portion, the first relay portion, the second relay portion, and the motor relay portion through the inverter pre-driver circuits, the first pre-driver circuit, or the second pre-driver circuit. The failure detecting section detects a failure of the first relay portion, the second relay portion, and the motor relay portion.

In the motor driving device, the second relay portion and the motor relay portion are driven by one pre-driver circuit. Thus, the number of pre-driver circuits can be reduced, and a size of the motor driving device can be reduced.

An electric power steering apparatus according to another aspect of the present disclosure includes the motor and the motor driving device.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
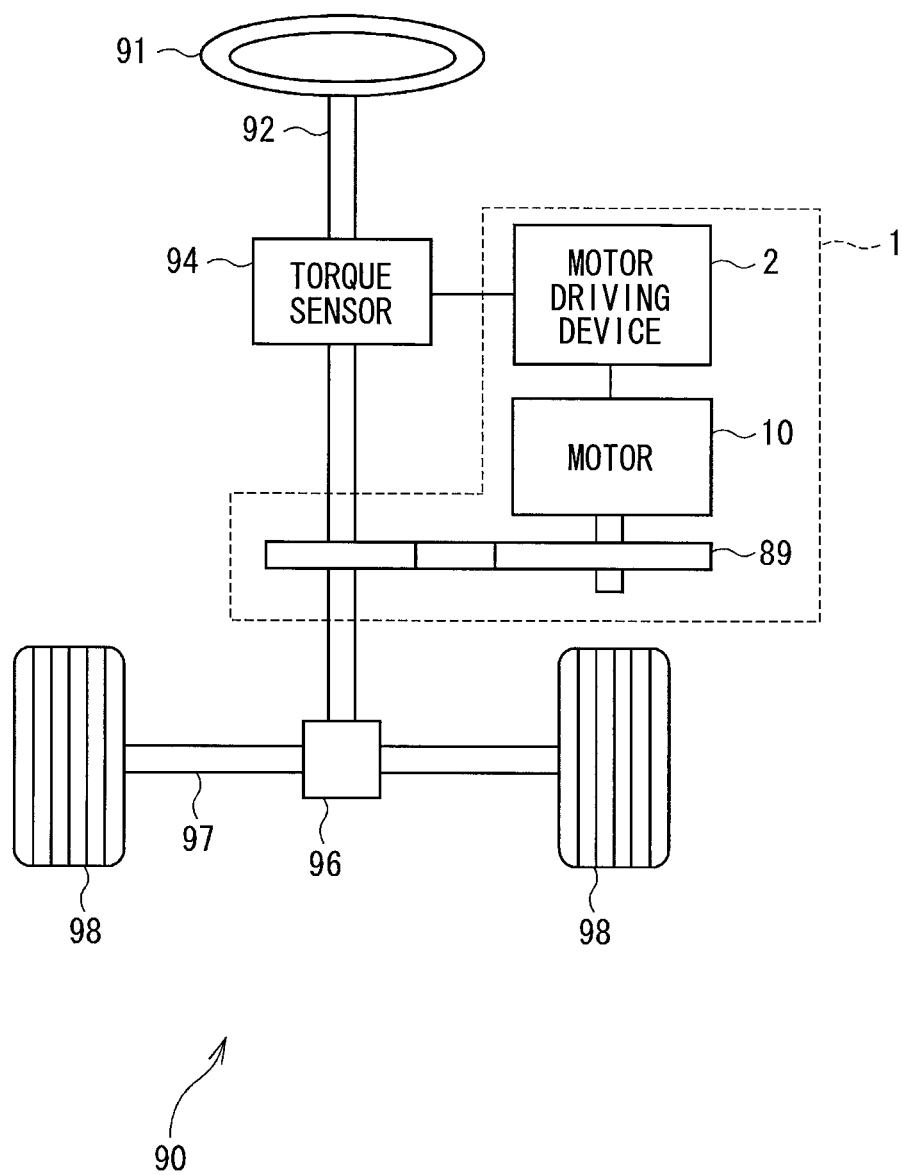
FIG. 1 is a diagram showing an electric power steering apparatus according to a first embodiment of the present disclosure.

Motor driving devices and electric power steering apparatuses according to the present disclosure will be described with reference to the drawings. In the following embodiments, components having similar structures are denoted by the same reference numerals and an explanation will be omitted.

(First Embodiment)

A motor driving device 2 according to a first embodiment of the present disclosure is applied to an electric power steering apparatus 1.

As shown in FIG. 1, a steering system 90 includes the electric power steering apparatus 1, a steering wheel 91, and a steering shaft 92. The steering wheel 91 operated by a driver is connected to the steering shaft 92. In the present disclosure, the term "connected to" means direct or indirect connection unless otherwise specified. A pinion gear 96 is attached to an end of the steering shaft 92. The pinion gear 96 engages with a rack shaft 97. Tire wheels are rotatably connected to ends of the rack shaft 97 through, for example, tire rods. Accordingly, when the driver rotates the steering wheel 91, the steering shaft 92 rotates, and the pinion gear 96 converts a rotational movement of the steering shaft 92 into a linear movement of the rack shaft 97. Then, directions of the tires 98 are changed by an angle depending on a displacement of the linear movement of the rack shaft 97. The steering shaft 92 is attached to a torque sensor 94 that detects a steering torque applied to the steering wheel 91.

The electric power steering apparatus 1 includes the motor driving device 2, a motor 10, and a gear 89. The motor 10 outputs a torque for assisting a steering operation of the steering wheel 91 by the driver.

The motor 10 is three-phase brushless motor that rotates the gear 89 forward and backward. The motor 10 includes a stator, a rotor, and a shaft, which are not shown. The rotor rotates with the shaft. The rotor is attached with a permanent magnet on a surface and has magnetic poles. The rotor is rotatably held in the stator. The stator has a protruding portion at each predetermined angle. The protruding portions protrude radially-inward. A U-phase coil 11, a V-phase coil 12, and a W-phase coil 13 are wound to the protruding portions. The U-phase coil 11, the V-phase coil 12, and the W-phase coil 13 are connected, for example, in Y-connection. The U-phase coil 11, the V-phase coil 12, and the W-phase coil 13 are included in a winding group 15.

The gear 89 transmits a rotation of the motor 10 to the steering shaft 92 with reducing a speed. Accordingly, the electric power steering apparatus 1 transmits an auxiliary torque based on a steering direction and the steering torque Tq of the steering wheel 91 to the steering shaft 92.

Figure 2:
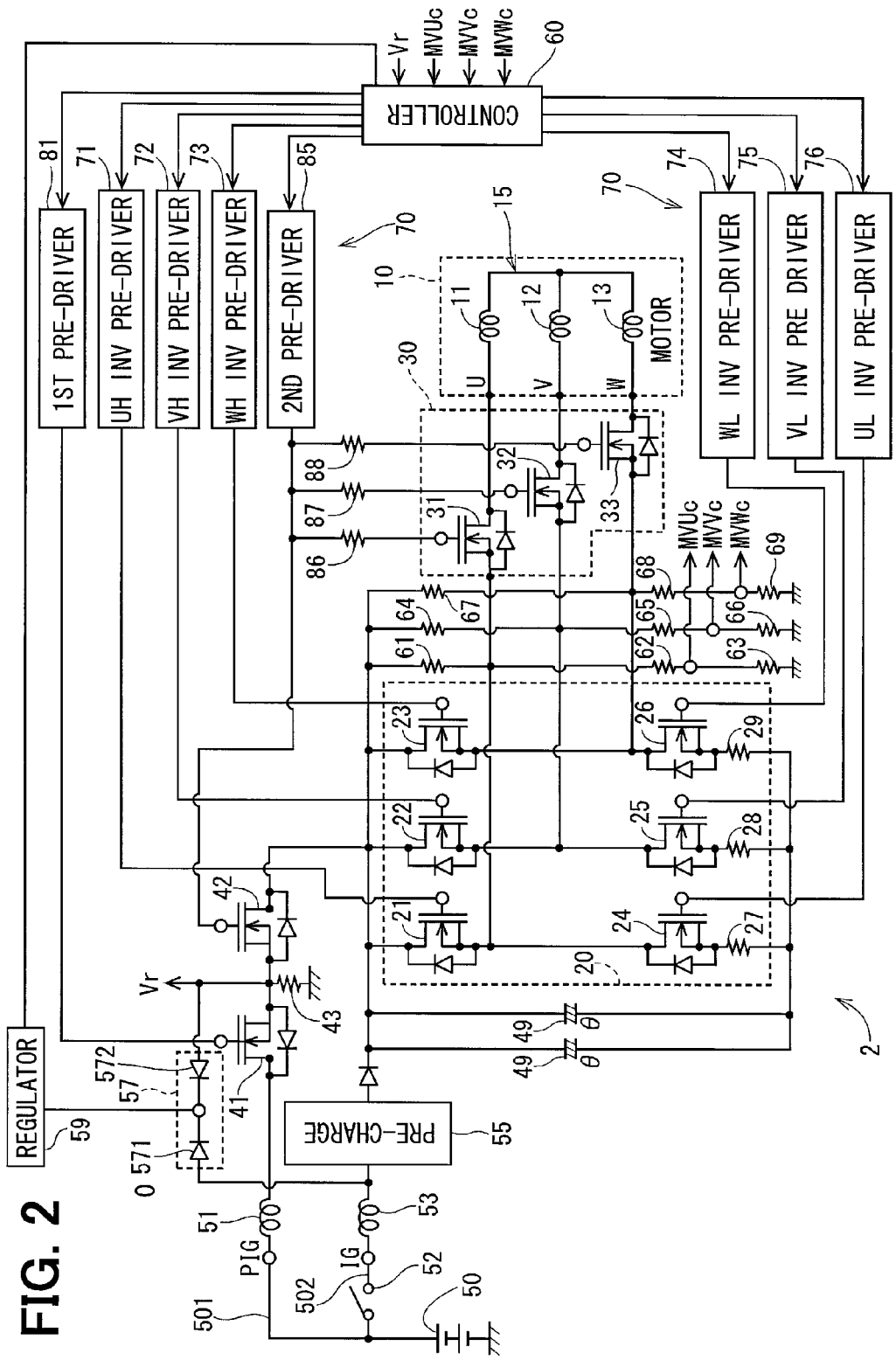
FIG. 2 is a circuit diagram showing a motor driving device according to the first embodiment.

As shown in FIG. 2, the motor driving device 1 includes an inverter portion 20, a motor relay portion 30, a power source relay 41, a reverse connection protection relay 42, a controller 60, and a pre-driver circuit portion 70. The power source relay 41 is an example of a first relay portion, and the reverse connection protection relay 42 is an example of a second relay portion.

The inverter portion 20 is a three-phase inverter. The inverter portion 20 includes MOSFETs 21-26 forming a bridge connection. The MOSFETs 21-26 are switching elements to switch power supply to the U-phase coil 11, the V-phase coil 12, and the W-phase coil 13.

A drain of the MOSFET 21 is connected to a high potential terminal of a battery 50 as a power source, and a source of the MOSFET 21 is connected to a drain of the MOSFET 24. A source of the MOSFET 24 is connected to the ground through a shunt resistor 27. A connection point of the source of the MOSFET 21 and the drain of the MOSFET 24 is connected to an end of the U-phase coil 11 through a U-phase motor relay 31. The MOSFET 21 and the MOSFET 24 can operate as U-phase inverters.

A drain of the MOSFET 22 is connected to a high potential terminal of the battery 50, and a source of the MOSFET 22 is connected to a drain of the MOSFET 25. A source of the MOSFET 25 is connected to the ground through a shunt resistor 28. A connection point of the source of the MOSFET 22 and the drain of the MOSFET 25 is connected to an end of the V-phase coil 12 through a V-phase motor relay 32. The MOSFET 22 and the MOSFET 25 can operate as V-phase inverters.

A drain of the MOSFET 23 is connected to a high potential terminal of the battery 50, and a source of the MOSFET 26 is connected to a drain of the MOSFET 26. A source of the MOSFET 26 is connected to the ground through a shunt resistor 29. A connection point of the source of the MOSFET 23 and the drain of the MOSFET 26 is connected to an end of the W-phase coil 13 through a W-phase motor relay 33. The MOSFET 23 and the MOSFET 26 can operate as W-phase inverters.

The shunt resistors 27-29 are used for detecting electric currents that flow to the respective phases. The controller 60 detects the electric current that flows to the U-phase coil 11 on the basis of a voltage across the shunt resistor 27. The controller 60 detects the electric current that flows to the V-phase coil 12 on the basis of a voltage across the shunt resistor 28. The controller 60 detects the electric current that flows to the W-phase coil 13 on the basis of a voltage across the shunt resistor 29.

The motor relay portion 30 includes a U-phase motor relay 31, a V-phase motor relay 32, and a W-phase motor relay 33. In the present embodiment, each of the U-phase motor relay 31, the V-phase motor relay 32, and the W-phase motor relay 33 includes a MOSFET similar to the MOSFETs 21-26.

The U-phase motor relay 31 is disposed between the connection point of the MOSFET 21 and the MOSFET 24 and the U-phase coil 11. A source of the U-phase motor relay 31 is connected to the connection point of the MOSFET 21 and the MOSFET 24, and a drain of the U-phase motor relay 31 is connected to the U-phase coil 11. The U-phase motor relay 31 is capable of cutting off electrical connection between the MOSFETs 21, 24 and the U-phase coil 11 when a failure of the motor 10 occurs. The V-phase motor relay 32 is disposed between the connection point of the MOSFET 22 and the MOSFET 25 and the V-phase coil 12. A source of the V-phase motor relay 32 is connected to the connection point of the MOSFET 22 and the MOSFET 25, and a drain of the V-phase motor relay 32 is connected to the V-phase coil 12. The V-phase motor relay 32 is capable of cutting off electrical connection between the MOSFETs 22, 25 and the V-phase coil 12 when a failure of the motor 10 occurs. The W-phase motor relay 33 is disposed between the connection point of the MOSFET 23 and the MOSFET 26 and the W-phase coil 13. A source of the W-phase motor relay 33 is connected to the connection point of the MOSFET 23 and the MOSFET 26, and a drain of the W-phase motor relay 33 is connected to the W-phase coil 13. The W-phase motor relay 33 is capable of cutting off electrical connection between the MOSFETs 23, 26 and the W-phase coil 13 when a failure of the motor 10 occurs.

The power source relay 41 is connected between the battery 50 and the inverter portion 20. The reverse connection protection relay 42 is connected between the power source relay 41 and the inverter portion 20. In the present embodiment, each of the power source relay 41 and the reverse connection protection relay 42 includes a MOSFET similar to the MOSFETs 21-16. In the present embodiment, each of the MOSFETs, 21-26, motor relays 31-33, the power source relay 41, and the reverse connection protection relay 42 becomes a closed (electrically-connected) state when turned on and becomes an open (electrically-disconnected) state when turned off.

A drain of the power source relay 41 is connected to the battery 50 and a source of the power source relay 41 is connected to the reverse connection protection relay 42. When a failure of the electric power steering apparatus 1 occurs, the controller 60 turns off the power source relay 41 to be the open state and cuts off power supply from the battery 50 to the inverter portion 20.

A source of the reverse connection protection relay 42 is connected to the power source relay 41, and a drain of the reverse connection protection relay 42 is connected to the inverter portion 20. In the present embodiment, each of the power source relay 41 and the reverse connection protection relay 42 includes a MOSFET having a parasitic diodes as a parasitic element. The reverse connection protection relay 42 is disposed in such a manner that a direction of the parasitic diode of the reverse connection protection relay 42 is opposite from a direction of the parasitic diode of the power source relay 41 so as to protect an electronic circuit in the motor driving device 2 in case the battery 50 and capacitors 49, which can function as power supply source, are connected in reverse polarity. Accordingly, electric current in both directions can be cut off. A connection point of the power source relay 41 and the reverse connection protection relay 42 is connected to the ground through a resistor 43. The controller 60 monitors a voltage Vr at the connection point of the power source relay 41 and the reverse connection protection relay 42.

The capacitors 49 are connected in parallel with the inverter portion 20. In the present embodiment, the capacitors 49 are electrolytic capacitor. The capacitors 49 store charge to assist the power supply to the inverter portion 20 and remove a noise component, such as surge current. In the present embodiment, the motor driving device 2 includes two capacitors 49. However, the number of the capacitors may be changed.

The battery 50 is a direct-current power source. In the present embodiment, a power source voltage is 12 V. The battery 50 is connected with the power source relay 41 through a choke coil 51. In addition, the battery 50 is connected to a pre-charge circuit 55 through an ignition switch 52 and a choke coil 53, which are connected in parallel with the power source relay 41 and the reverse connection protection relay 42.

The pre-charge circuit 55 is connected between the battery 50 and the inverter portion 20 in parallel with the power source relay 41 and the reverse connection protection relay 42. Hereafter, a line on which the power source relay 41 and the reverse connection protection relay 42 are disposed is referred to as a PIG line 501, and a line on which the ignition switch 52 and the pre-charge circuit 55 are disposed is referred to as an IG line 502.

The pre-charge circuit 55 previously charges a predetermined voltage to the capacitors 49 by receiving the power supply from the battery 50 through the IG line 502 when the ignition switch 52 is turned on by the driver. In the present embodiment, the capacitors 40 are charged to about 6 V by the pre-charge circuit 55. Accordingly, a large current does not flow to the inverter portion 20 when the power source relay 41 and the reverse connection protection relay 42 are turned on.

An OR circuit portion 57 includes two diodes 571, 572. An input terminal of the diode 571 is connected between the choke coil 53 and the pre-charge circuit 55, and an output terminal of the diode 571 is connected to an output terminal of the diode 572. An input terminal of the diode 572 is connected between the power source relay 41 and the reverse connection protection relay 42, and the output terminal of the diode 572 is connected to the output terminal of the diode 571. The output terminals of the diodes 571, 572 are connected to the controller 60 through a regulator 59. Accordingly, the controller 60 receives power supply from between the ignition switch 52 and the inverter portion 20 or from between the power source relay 41 and the reverse connection protection relay 42. The power supplied to the controller 60 is adjusted to be a predetermined voltage (e.g., 5V in the present embodiment) by the regulator 59.

When the ignition switch 52 is in on-state, the controller 60 receives power from the IG line 502 through the diode 571. When the ignition switch 52 is turned-off in a state where the power source relay 41 is in on-state, the controller 60 receives power from the PIG line 501 through the diode 572. Accordingly, even when the ignition switch 52 is turned off by the driver, the power supply to the controller 60 continues. Thus, the controller 60 does not lose the power supply suddenly, and the controller 60 can perform a predetermined control ending process, for example, for writing a failure diagnosis result to an electrically erasable programmable read-only memory (EEPROM). When the predetermined control ending process ends, the controller 60 may turn off the power source relay 41 to end the power supply to the controller 60.

Between the MOSFETs 21, 24 and the U-phase motor relay 31, a pull-up resistor 61 connected to the high-potential terminal of the battery 50 is disposed. In addition, between the MOSFETs 21, 24 and the U-phase motor relay 31, the pull-down resistors 62, 63 connected to the ground and forming a voltage dividing resistor are disposed. A voltage between the pull-down resistors 62, 63 is monitored by the controller 60 as a U-phase terminal voltage corresponding value MVUc.

Between the MOSFETs 22, 25 and the V-phase motor relay 32, a pull-up resistor 64 connected to the high-potential terminal of the battery 50 is disposed. In addition, between the MOSFETs 22, 25 and the V-phase motor relay 32, the pull-down resistors 65, 66 connected to the ground and forming a voltage dividing resistor are disposed. A voltage between the pull-down resistors 65, 66 is monitored by the controller 60 as a V-phase terminal voltage corresponding value MVVc.

Between the MOSFETs 23, 26 and the W-phase motor relay 33, a pull-up resistor 67 connected to the high-potential terminal of the battery 50 is disposed. In addition, between the MOSFETs 23, 26 and the W-phase motor relay 33, the pull-down resistors 68, 69 connected to the ground and forming a voltage dividing resistor are disposed. A voltage between the pull-down resistors 68, 69 is monitored by the controller 60 as a W-phase terminal voltage corresponding value MVWc. The pull-down resistors 62, 65, 68 are respectively connected to the pull-up resistors 61, 64, 67, and the pull-down resistors 63, 66, 69 are respectively connected between the pull-down resistors 62, 65, 68 and the ground.

A resistance R11 of the pull-up resistor 61 of the U-phase, a resistance R21 of the pull-up resistor 64 of the V-phase, and a resistance R31 of the pull-up resistor 67 of the W-phase are equal to each other. In other words, R11=R21=R31. A resistance R12 of the pull-down resistor 62 of the U-phase, a resistance R22 of the pull-down resistor 65 of the V-phase, and a resistance R32 of the pull-down resistor 68 of the W-phase are equal to each other. In other words, R12=R22=R32. A resistance R13 of the pull-down resistor 63 of the U-phase, a resistance R23 of the pull-down resistor 66 of the V-phase, and a resistance R33 of the pull-down resistor 69 of the W-phase are equal to each other. In other words, R13=R23=R33.

A ratio of the resistance R11 of the pull-up resistor 61, the resistance R12 of the pull-down resistor 62, and the resistance R13 of the pull-down resistor 63 is 4:3:1. In other words, R11:R12:R13=4:3:1. A ratio of the resistance R21 of the pull-up resistor 64, the resistance R22 of the pull-down resistor 65, and the resistance R23 of the pull-down resistor 66 is 4:3:1. In other words, R21:R22:R23=4:3:1. A ratio of the resistance R31 of the pull-up resistor 67, the resistance R32 of the pull-down resistor 68, and the resistance R33 of the pull-down resistor 69 is 4:3:1. In other words, R31:R32:R33=4:3:1.

When the pull-down resistors 62, 63 are considered as a combined resistor having a resistance R14, a ratio of the resistance R11 of the pull-up resistor 61 and the resistance R14 of the combined resistor of the pull-down resistors 62, 63 is 1:1. In other words, R11:R14=1:1. When the pull-down resistors 65, 66 are considered as a combined resistor having a resistance R24, a ratio of the resistance R21 of the pull-up resistor 64 and the resistance R24 of the combined resistor of the pull-down resistors 65, 66 is 1:1. In other words, R21:R24=1:1. When the pull-down resistors 68, 69 are considered as a combined resistor having a resistance R34, a ratio of the resistance R31 of the pull-up resistor 67 and the resistance R34 of the combined resistor of the pull-down resistors 68, 69 is 1:1. In other words, R31:R34=1:1.

The resistances of the resistors 61-69 may be appropriately set on the basis of the voltage of the battery 50 and the voltage detectable by the controller 60. In the present embodiments, the resistances of the resistors 61-69 have the above-described ratios because the voltage of the battery 50 is 12 V and the voltage detectable by the controller 60 is 5 V. Accordingly, the U-phase terminal voltage corresponding value MVUc, the V-phase terminal voltage corresponding value MVVc, and the W-phase terminal voltage corresponding value MVMc are less than or equal to 5V and are detectable by the controller 60.

The controller 60 is a conventional computer including a central processing unit (CPU), a read only memory (ROM), an input/output (I/O) part, and bus line connecting the above-described components. The controller 60 acquires the voltage Vr between the power source relay 41 and the reverse connection protection relay 42. In addition, the controller 60 acquires the voltage between the pull-down resistor 62 and the pull-down resistor 63 as the U-phase terminal voltage corresponding value MVUc. The controller 60 acquires the voltage between the pull-down resistor 65 and the pull-down resistor 66 as the V-phase terminal voltage corresponding value MVVc. The controller 60 acquires the voltage between the pull-down resistor 68 and the pull-down resistor 69 as the W-phase terminal voltage corresponding value MVWc.

Because the ratios of the resistances R12, R22, R23 of the pull-down resistors 62, 65, 68 and the resistances R13, R23, R33 of the pull-down resistors 63, 66, 69 are 3:1, the terminal voltage corresponding values MVUc, MVVc, MVWc acquired by the controller 60 are ¼ of actual terminal voltages MVU, MVV, MVW. Thus, the controller 60 quadruples the acquired terminal voltage corresponding values MVUc, MVVc, MVWc using software to calculate the terminal voltages MVU, MVV, MVW. It can be considered that the controller 60 acquires the terminal voltages MVU, MVV, MVW including the internal conversion of the terminal voltage corresponding values MVUc, MVVc, MVWc.

The controller 60 detects a failure of the motor relays 31-33, the power source relay 41, and the reverse connection protection relay 42 on the basis of the voltage Vr between the power source relay 41 and the reverse connection protection relay 42, the U-phase terminal voltage MVU, the V-phase terminal voltage MVV, and the W-phase terminal voltage MVW. A detail of failure detection will be described later. In addition, the controller 60 controls driving of the MOSFETs 21-26, the motor relays 31-33, the power source relay 41, and the reverse connection protection relay 42 through the pre-driver circuit portion 70.

The pre-driver circuit portion 70 includes a U-phase high-potential-side inverter pre-driver circuit (UH INV PRE-DRIVER) 71, a V-phase high-potential-side inverter pre-driver circuit (VH INV PRE-DRIVER) 72, a W-phase high-potential-side inverter pre-driver circuit (WH INV PRE-DRIVER) 73, a W-phase low-potential-side inverter pre-driver circuit (WL INV PRE-DRIVER) 74, a V-phase low-potential-side inverter pre-driver circuit (VL INV PRE-DRIVER) 75, a U-phase low-potential-side inverter pre-driver circuit (UL INV PRE-DRIVER) 76, a first pre-driver 81, and a second pre-driver circuit 85.

The U-phase high-potential-side inverter pre-driver circuit 71 is controlled by the controller 60 to switch the on/off state of the MOSFET 21 connected to the U-phase high-potential-side inverter pre-driver circuit 71. The V-phase high-potential-side inverter pre-driver circuit 72 is controlled by the controller 60 to switch the on/off state of the MOSFET 22 connected to the V-phase high-potential-side inverter pre-driver circuit 72. The W-phase high-potential-side inverter pre-driver circuit 73 is controlled by the controller 60 to switch the on/off state of the MOSFET 23 connected to the W-phase high-potential-side inverter pre-driver circuit 73. The W-phase low-potential-side inverter pre-driver circuit 74 is controlled by the controller 60 to switch the on/off state of the MOSFET 26 connected to the W-phase low-potential-side inverter pre-driver circuit 74. The V-phase low-potential-side inverter pre-driver circuit 75 is controlled by the controller 60 to switch the on/off state of the MOSFET 25 connected to the V-phase low-potential-side inverter pre-driver circuit 75. The U-phase low-potential-side inverter pre-driver circuit 76 is controlled by the controller 60 to switch the on/off state of the MOSFET 24 connected to the U-phase low-potential-side inverter pre-driver circuit 76.

The U-phase high-potential-side inverter pre-driver circuit 71, the V-phase high-potential-side inverter pre-driver circuit 72, the W-phase high-potential-side inverter pre-driver circuit 73, the W-phase low-potential-side inverter pre-driver circuit 74, the V-phase low-potential-side inverter pre-driver circuit 75, the U-phase low-potential-side inverter pre-driver circuit 76 can operate as inverter pre-driver circuits.

The first pre-driver circuit 81 is controlled by the controller 60 to switch the on/off state of the power source relay 41 connected with the first pre-driver circuit 81. The second pre-driver circuit 85 is controlled by the controller 60 to switch the on/off states of the motor relays 31-33 and the reverse connection protection relay 42. In the present embodiment, because the motor relays 31-33 and the reverse connection protection relay 42 are driven by the one second pre-driver circuit 85, the on/off states of the motor relays 31-33 and the reverse connection protection relay 42 are switched at the same time.

Between the second pre-driver circuit 85 and the U-phase motor relay 31, a gate resistor 86 is disposed. Between the second pre-driver circuit 85 and the V-phase motor relay 32, a gate resistor 87 is disposed. Between the second pre-driver circuit 85 and the W-phase motor relay 33, a gate resistor 88 is disposed. Also between the pre-driver circuits 71-76, 81, 85 and the MOSFETs 21-26, the power source relay 41, and the reverse connection protection relay 42, gate resistors (not shown) are disposed.

In the present embodiment, focusing on that a failure of the motor relays 31-33, the power source relay 41, and the reverse connection protection relay 42 can be detected even when the on/off states of the motor relays 31-33 and the reverse connection protection relay 42 are switched at the same time, pre-drivers for driving the motor relays 31-33 and a pre-driver for driving the reverse connection protection relay 42 are consolidated into one pre-driver circuit (i.e., the second pre-driver circuit 85 in the present embodiment).

Figure 3:
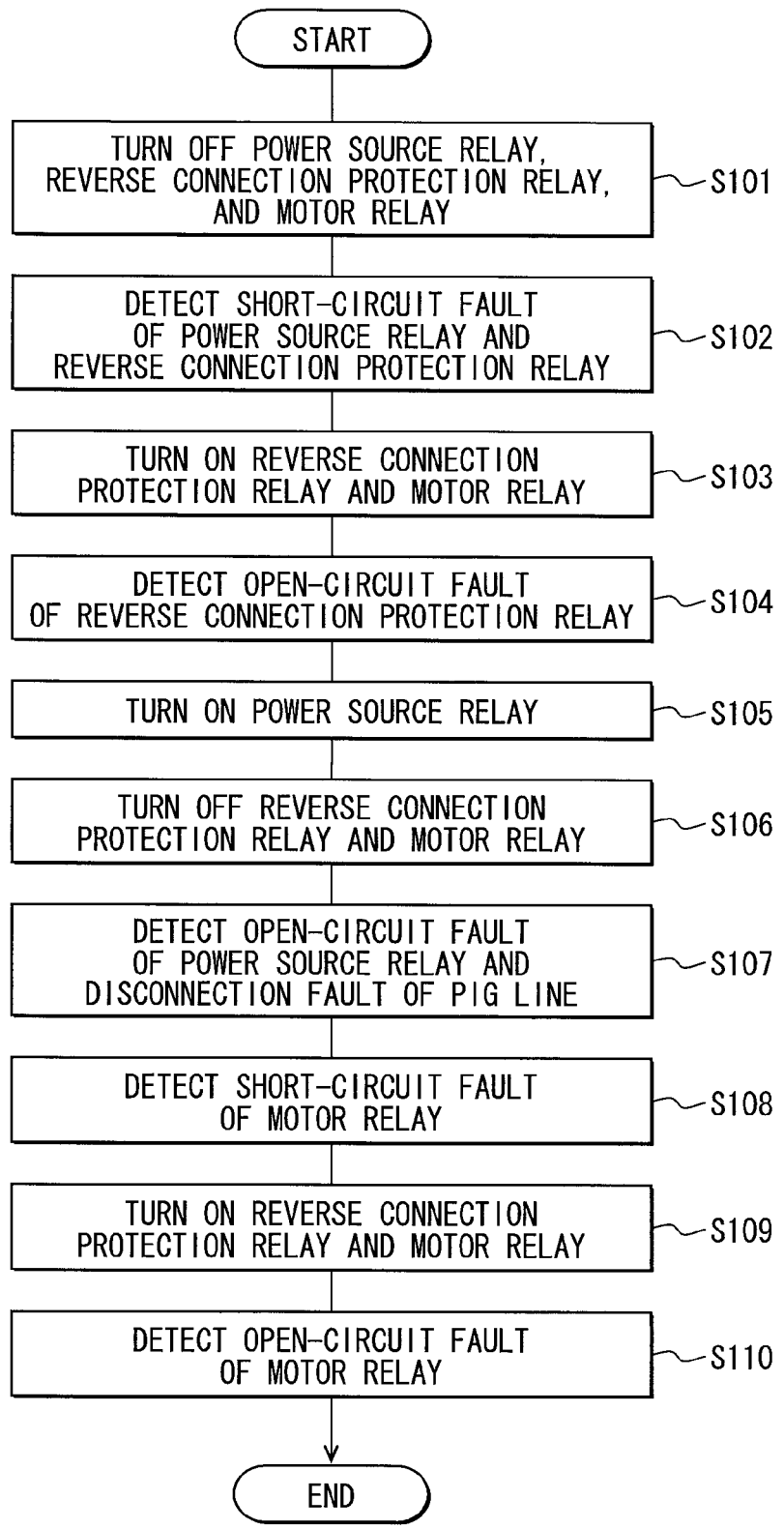
FIG. 3 is a flowchart showing an initial failure diagnosis process according to the first embodiment.

An initial failure diagnosis process for detecting a failure of the motor relays 31-33, the power source relay 41, and the reverse connection protection relay 42 will be described with reference to FIG. 3. When the ignition switch 52 is turned on, the controller 60 performs the initial failure diagnosis process before activating the power steering apparatus 1. When the ignition switch 52 is turned on, the MOSFETs 21-26, the power source relay 41, and the reverse connection protection relay 42 are normally in the off-state (i.e., open state).

At S101, the controller 60 turns off the power source relay 41 through the first pre-driver circuit 81. In addition, the controller 60 turns off the motor relays 31-33 and the reverse connection protection relay 42 through the second pre-driver circuit 85.

At S102, the controller 60 detects a short-circuit fault of the power source relay 41 and the reverse connection protection relay 42 on the basis of the voltage Vr between the power source relay 41 and the reverse connection protection relay 42. Because the power source relay 41 and the reverse connection protection relay 42 are controlled to be the off-state, the voltage Vr is 0 V when a short-circuit fault does not occur in the power source relay 41 and the reverse connection protection relay 42. When a short-circuit fault occurs in the power source relay 41, the voltage Vr becomes the power source voltage (i.e., 12 V in the present embodiment). On the other hand, when a short-circuit fault occurs in the reverse connection protection relay 42, power is supplied from the pre-charge circuit 55, and the voltage Vr becomes greater than or equal to the pre-charge voltage (i.e., 6 V in the present embodiment).

When the ignition switch 52 is turned on just after turned off by the driver and the controller 60 performs the present process, the capacitors 49 are charged with a voltage substantially equal to the power source voltage, and power is supplied also from the capacitors 49. Thus, even when a short-circuit fault occurs in the reverse connection protection relay 42, the voltage Vr may be substantially equal to the power source voltage similarly to a case where a short-circuit fault occurs in the power source relay 41. In this case, it is difficult to whether a short-circuit fault occurs in the power source relay 41 or the reverse connection protection relay 42. Thus, the controller 60 determines that a short-circuit fault occurs in the power source relay 41 or the reverse connection protection relay 42. In any case, the controller 60 determines that the power source relay 41 and the reverse connection protection relay 42 operates normally when the voltage Vr is 0 V and determines that a short-circuit fault occurs in the power source relay 41 or the reverse connection protection relay 42 when the voltage Vr is not 0 V. It should be noted that "the voltage Vr is 0 V" means the voltage Vr is in a predetermined range including 0 V in view of a sensor error and the like. The same is applied to all threshold values relating to failure detections.

At S103, the controller 60 turns on the motor relays 31-33 and the reverse connection protection relay 42 through the second pre-driver circuit 85. Because the motor relays 31-33 and the reverse connection protection relay 42 are driven by the one second pre-driver circuit 85, the motor relays 31-33 and the reverse connection protection relay 42 are turned on at the same time. At S104, the controller 60 detects an open-circuit fault of the reverse connection protection relay 42 on the basis of the voltage Vr between the power source relay 41 and the reverse connection protection relay 42. In the present state, the power source relay 41 is in the off-state and the reverse connection protection relay 42 is in the on-state. Thus, when an open-circuit fault does not occur in the reverse connection protection relay 42, the voltage Vr becomes greater than or equal to the pre-charge voltage (i.e., 6V in the present embodiment) due to the power supply from the pre-charge circuit 55. On the other hand, when an open-circuit fault occurs in the reverse connection protection relay 42, the voltage Vr becomes 0 V. Accordingly, the controller 60 can detect an open-circuit fault of the reverse connection protection relay 42.

At S105, the controller 60 turns on the power source relay 41 through the first pre-driver circuit 81. In the present state, the reverse connection protection relay 42 and the motor-relays 31-33 are also in the on-state. Because both of the power source relay 41 and the reverse connection protection relay 42 are in the on-state, power is supplied from the PIG line 501 to the capacitors 49 and the capacitors 49 store charges. In the present embodiment, a predetermined waiting time (e.g., 200 msec) is provided at S105 so that the capacitors 49 are charged to the power source voltage with certainty. At S106, the controller 60 turns off the motor relays 31-33 and the reverse connection protection relay 42 through the second pre-driver circuit 85. Because the motor relays 31-33 and the reverse connection protection relay 42 are driven by the one second pre-driver circuit 85, the motor relays 31-33 and the reverse connection protection relay 42 are turned off at the same time.

At S107, the controller 60 detects an open-circuit fault of the power source relay 41 and a disconnection fault of the PIG line 501 on the basis of the voltage Vr. When a disconnection of the PIG line 501 does not occur and an open-circuit fault of the power source relay 41 does not occur, the voltage Vr becomes the power source voltage. On the other hand, when a disconnection of the PIG line 501 occurs or when an open-circuit fault of the power source relay 41 occurs, the voltage Vr becomes 0 V. Accordingly, the controller 60 detects the open-circuit fault of the power source relay 41 and the disconnection of the PIG line 501.

At S108, the controller 60 detects a short-circuit fault of the motor relays 31-33 on the basis of the terminal voltages MVU, MVV, MVW. The controller 60 detects a short-circuit fault of the U-phase motor relay 31 on the basis of the terminal voltages MVU, MVV, MVW at a time when the MOSFET 24 is in the completely on-state and the MOSFETs 21-23, 25, 26 are in the off-state. The controller 60 detects a short-circuit fault of the V-phase motor relay 32 on the basis of the terminal voltages MVU, MVV, MVW at a time when the MOSFET 25 is in the completely on-state and the MOSFETs 21-24, 26 are in the off-state. The controller 60 detects a short-circuit fault of the W-phase motor relay 33 on the basis of the terminal voltages MVU, MVV, MVW at a time when the MOSFET 26 is in the completely on-state and the MOSFETs 21-25 are in the off-state. The controller 60 detects short-circuit faults of the U-phase motor relay 31, the V-phase motor relay 32, and the W-phase motor relay 33 similarly to each other. Thus, only a detection of a short-circuit fault in the U-phase motor relay 31 will be described below.

When the MOSFET 24 is in the completely on-state, the MOSFETs 21-23, 25, 26 are in the off-state, and a short-circuit fault does not occur in the U-phase motor relay 31, the U-phase terminal voltage MVU becomes 0 V. The V-phase terminal voltage MVV becomes a value obtained by dividing the power source voltage (strictly speaking, the voltage stored at the capacitors 49) by the pull-up resistor 64 and the combined resistor of the pull-down resistors 65, 66. In the present embodiment, the ratio of the resistance R21 of the pull-up resistor 64 and the resistance R24 of the combined resistor of the pull-down resistors 65, 66 is 1:1. Thus, when a short-circuit fault does not occur in the U-phase motor relay 31, the V-phase terminal voltage MVV becomes the power source voltage×0.5. Similarly, when a short-circuit fault does not occur in the U-phase motor relay 31, the W-phase terminal voltage MVW becomes the power source voltage×0.5.

When a short-circuit fault occurs in the U-phase motor relay 31, the U-phase terminal voltage MVU is 0 V similarly to a case where a short-circuit fault does not occur. When the MOSFET 24 is turned on in a state where a short-circuit fault occurs in the U-phase motor relay 31, when focusing on the V-phase, the pull-down resistors 65, 66, and the U-phase coil 11 and the V-phase coil 12 are connected in parallel with respect to the pull-up resistor 64. Thus, when a short-circuit fault occurs in the U-phase motor relay 31, the V-phase terminal voltage MVV becomes a value different from the value obtained by dividing the power source voltage by the pull-up resistor 64 and the pull-down resistors 65, 66 (i.e., the power source voltage×0.5 in the present embodiment) at a time when a short-circuit fault does not occur in the U-phase motor relay 31.

Furthermore, when focusing on the W-phase, the pull-down resistors 68, 69, and the U-phase coil 11 and the W-phase coil 13 are connected in parallel with respect to the pull-up resistor 67. Thus, similarly to the V-phase terminal voltage MVV, the W-phase terminal voltage MVW becomes a value different from the value obtained by dividing the power source voltage by the pull-up resistor 67 and the pull-down resistors 68, 69 (i.e., the power source voltage×0.5 in the present embodiment) at a time when a short-circuit fault does not occur in the U-phase motor relay 31. The V-phase terminal voltage MVV will be described below, and a description about the W-phase terminal voltage MVW will be omitted.

The V-phase terminal voltage MVV at a time when a short-circuit fault occurs in the U-phase motor relay 31 depends on the resistances of the pull-up resistor 64, the pull-down resistors 65, 66, the U-phase coil 11, and the V-phase coil 12. In the present embodiment, the V-phase terminal voltage MVV at a time when a short-circuit fault occurs in the U-phase motor relay 31 is smaller than the V-phase terminal voltage MVV at a time when a short-circuit fault does not occur in the U-phase motor relay 31.

The V-phase terminal voltage MVV at a time when the MOSFET 24 is in the completely on-state, the MOSFETs 21-23, 25, 26 are in the off-state, and a short-circuit fault occurs in the U-phase motor relay 31 can be expressed by the following equation (1). In the equation (1), the resistance of the U-phase coil 11 is denoted by RM1, the resistance of the V-phase coil 12 is denoted by RM2. In the present embodiment, RM1=RM2. The resistance of the shunt resistor 25 and a voltage drop due to the parasitic diode are regarded as being negligible and are not taken into consideration.

$$MVV = \frac{\frac{(RM1+RM2)(R22+R23)}{RM1+RM2+R22+R23}}{\frac{(RM1+RM2)(R22+R23)}{RM1+RM2+R22+R23}+R21} \times \frac{R23}{R22+R23} \times VPIG \times 4 \quad (1)$$

A combined resistance Rc of the parallel circuit formed by the pull-down resistors 65, 66, and the U-phase coil 11 and the V-phase coil 12 can be expressed by the following equation (2). In addition, the equation (1) can be expressed as the following equation (3) using the combined resistance Rc.

$$Rc = \frac{(RM1+RM2)(R22+R23)}{RM1+RM2+R22+R23} \quad (2)$$

$$MVV = \frac{Rc}{Rc+R21} \times \frac{R23}{R22+R23} \times VPIG \times 4 \quad (3)$$

Because R21:R22:R23=4:3:1, R21 is set to 4R, R22 is set to 3R, and R23 is set to R. In addition, because RM1=RM2, RM1 and RM2 are set to RM. Then, the V-phase terminal voltage MVV can be expressed by the following equation (4).

$$MVV = \frac{\frac{8 \times RM \times R}{2RM+4R}}{\frac{8 \times RM \times R}{2RM+4R}+4R} \times \frac{R}{4R} \times VPIG \times 4 \quad (4)$$

In the present embodiment, R21-R23 are a few kΩ, and RM1 and RM2 are tens of mΩ. Thus, when a short-circuit fault occurs in the U-phase motor relay 31, the V-phase terminal voltage MVV becomes about 0 V, and the W-phase terminal voltage MVW also becomes about 0 V.

In other words, when the MOSFET 24 is in the completely on-state and a short-circuit fault does not occur in the U-phase motor relay 31, the U-phase terminal voltage MVU becomes 0 V, and the V-phase terminal voltage MVV and the W-phase terminal voltage MVW become the power source voltage× 0.5. On the other hand, when the MOSFET 24 is in the completely on-state and a short-circuit fault occurs in the U-phase motor relay 31, the U-phase terminal voltage MVU, the V-phase terminal voltage MVV, and the W-phase terminal voltage MVW become about 0 V.

Similarly, when the MOSFET 25 is in the completely on-state and a short-circuit fault does not occur in the V-phase motor relay 32, the V-phase terminal voltage MVV becomes 0 V, and the U-phase terminal voltage MVU and the W-phase terminal voltage MVW become the power source voltage× 0.5. On the other hand, when the MOSFET 25 is in the completely on-state and a short-circuit fault occurs in the V-phase motor relay 32, the U-phase terminal voltage MVU, the V-phase terminal voltage MVV, and the W-phase terminal voltage MVW become about 0 V.

Similarly, when the MOSFET 26 is in the completely on-state and a short-circuit fault does not occur in the W-phase motor relay 33, the W-phase terminal voltage MVW becomes 0 V, and the U-phase terminal voltage MVU and the V-phase terminal voltage MVV become the power source voltage× 0.5. On the other hand, when the MOSFET 26 is in the completely on-state and a short-circuit fault occurs in the W-phase motor relay 33, the U-phase terminal voltage MVU, the V-phase terminal voltage MVV, and the W-phase terminal voltage MVW become about 0 V. Accordingly, the controller 60 can detect a short-circuit fault of the motor relays 31-33.

At S109, the controller 60 turns on the motor relays 31-33 and the reverse connection protection relay 42 through the second pre-driver circuit 85. Because the motor relays 31-33 and the reverse connection protection relay 42 are driven by the one second pre-driver circuit 85, the motor relays 31-33 and the reverse connection protection relay 42 are turned on at the same time similarly to S103.

At S110, the controller 60 detects an open-circuit fault of the motor relays 31-33 on the basis of the terminal voltages MVU, MVV, MVW. The controller 60 detects an open-circuit fault of the U-phase motor relay 31 on the basis of the terminal voltages MVU, MVV, MVW at a time when the MOSFET 24 is in the completely on-state and the MOSFETs 21-23, 25, 26 are in the off-state. The controller 60 detects an open-circuit fault of the V-phase motor relay 32 on the basis of the terminal voltages MVU, MVV, MVW at a time when the MOSFET 25 is in the completely on-state and the MOSFETs 21-24, 26 are in the off-state. The controller 60 detects an open-circuit fault of the W-phase motor relay 33 on the basis of the terminal voltages MVU, MVV, MVW at a time when the MOSFET 26 is in the completely on-state and the MOSFETs 21-25 are in the off-state. The controller 60 detects open-circuit faults of the U-phase motor relay 31, the V-phase motor relay 32, and the W-phase motor relay 33 similarly to each other. Thus, only a detection of an open-circuit fault in the U-phase motor relay 31 will be described below.

When the MOSFET 24 is in the completely on-state, the MOSFETs 21-23, 25, 26 are in the off-state, and an open-circuit fault does not occur in the U-phase motor relay 31, the U-phase terminal voltage MVU becomes 0 V. When the MOSFET 24 is turned on in a state where an open-circuit fault does occur in the U-phase motor relay 31, when focusing on the V-phase, he pull-down resistors 65, 66, and the U-phase coil 11 and the V-phase coil 12 are connected in parallel with respect to the pull-up resistor 64. Thus, the V-phase terminal voltage MVV becomes a value different from the value obtained by dividing the power source voltage by the pull-up resistor 64 and the combined resistor of the pull-down resistors 65, 66. In the present embodiment, the V-phase terminal voltage MVV becomes about 0 V.

Similarly, when focusing on the W-phase, the pull-down resistors 68, 69, and the U-phase coil 11 and the W-phase coil 13 are connected in parallel with respect to the pull-up resistor 67. Thus, the W-phase terminal voltage MVW becomes a value different from the value obtained by dividing the power source voltage by the pull-up resistor 67 and the combined resistor of the pull-down resistors 68, 69. In the present embodiment, the W-phase terminal voltage MVW becomes about 0 V.

When the MOSFET 24 is in the completely on-state and the MOSFETs 21-23, 25, 26 are in the off-state in a state where an open-circuit fault occurs in the U-phase motor relay 31, the U-phase terminal voltage MVU becomes 0 V. The V-phase terminal voltage MVV becomes the value obtained by dividing the power source voltage by the pull-up resistor 64 and the combined resistor of the pull-down resistors 65, 66 (i.e., the power source voltage×0.5 in the present embodiment). The W-phase terminal voltage MVW becomes the value obtained by dividing the power source voltage by the pull-up resistor 67 and the combined resistor of the pull-down resistors 68, 69 (i.e., the power source voltage×0.5 in the present embodiment).

In other words, when the MOSFET 24 is in the completely on-state and an open-circuit fault does not occur in the U-phase motor relay 31, the U-phase terminal voltage MVU, the V-phase terminal voltage MVV, and the W-phase terminal voltage MVW become about 0 V. On the other hand, when the MOSFET 24 is in the completely on-state and an open-circuit fault occurs in the U-phase motor relay 31, the U-phase terminal voltage MVU becomes 0 V, and the V-phase terminal voltage MVV and the W-phase terminal voltage MVW become the power source voltage×0.5.

Similarly, when the MOSFET 25 is in the completely on-state and an open-circuit fault does not occur in the V-phase motor relay 32, the U-phase terminal voltage MVU, the V-phase terminal voltage MVV, and the W-phase terminal voltage MVW become about 0 V. On the other hand, when the MOSFET 25 is in the completely on-state and an open-circuit fault occurs in the V-phase motor relay 32, the V-phase terminal voltage MVV becomes 0 V, and the U-phase terminal voltage MVU and the W-phase terminal voltage MVW become the power source voltage×0.5.

Similarly, when the MOSFET 26 is in the completely on-state and an open-circuit fault does not occur in the W-phase motor relay 33, the U-phase terminal voltage MVU, the V-phase terminal voltage MVV, and the W-phase terminal voltage MVW become about 0 V. On the other hand, when the MOSFET 26 is in the completely on-state and an open-circuit fault occurs in the W-phase motor relay 33, the W-phase terminal voltage MVW becomes 0 V, and the U-phase terminal voltage MVU and the V-phase terminal voltage MVV become the power source voltage×0.5. Accordingly, the controller 60 can detect an open-circuit fault of the motor relays 31-33.

As described above, even when pre-drivers for driving the motor relays 31-33 and the reverse connection protection relay 42 are consolidated into the one second pre-driver circuit 85, and the on/off states of the motor relays 31-33 and the reverse connection protection relay 42 are switched at the same time, the controller 60 can detect a short-circuit fault and an open-circuit fault of the motor relays 31-33, the power source relay 41, and the reverse connection protection relay 42.

As described above, the motor driving device 2 includes the inverter portion 20, the power source relay 41, the reverse connection protection relay 42, the motor relay portion 30, the inverter pre-driver circuits 71-76, the first pre-driver circuit 81, the second pre-driver circuit 85, and the controller 60.

The inverter portion 20 includes the MOSFETs 21-26 that switches the power supply to the winding group 15 of the motor 10. The power source relay 41 is connected between the battery 50 and the inverter portion 20. The reverse connection protection relay 42 is connected between the power source relay 41 and the inverter portion 20. The motor relay portion 30 is connected between the inverter portion 20 and the winding group 15 of the motor 10.

The inverter pre-driver circuits 71-76 are provided with respect to the MOSFETs 21-26 of the inverter portion 20 to drive the MOSFETs 21-26. The first pre-driver circuit 81 drives the power source relay 41. The second pre-driver circuit 85 drives the reverse connection protection relay 42 and the motor relay portion 30.

The controller 60 includes a control section and a failure detection section. The control section controls driving of the inverter portion 20, the power source relay 41, the reverse connection protection relay 42, and the motor relay portion 30 through the first pre-driver circuit 81 and the second pre-driver circuit 85. The failure detection section detects a failure of the power source relay 41, the reverse connection protection relay 42, and the motor relay portion 30.

In the present embodiment, pre-driver circuits for driving the reverse connection protection relay 42 and the motor relay portion 30 are consolidated into the one second pre-driver circuit 85 because the controller 60 can detect a failure of the power source relay 41, the reverse connection protection relay 42, and the motor relay portion 30 even when the on/off states of the reverse connection protection relay 42 and the motor relay portion 30 are switched at the same time. Accordingly, the number of the pre-driver circuit can be reduced. Thus, a size of the motor driving device 2, especially, a size of a control substrate on which electronic components forming the motor driving device 2 are disposed can be reduced.

The power source relay 41 and the reverse connection protection relay 42 are semiconductor devices having parasitic diodes. The power source relay 41 is capable of cutting off the power supply to the inverter portion 20. The reverse connection protection relay 42 is disposed such that the direction of the parasitic diode of the reverse connection protection relay 42 is opposite from the direction of the parasitic diode of the power source relay 41.

By using the semiconductor devices for the power source relay 41 and the reverse connection protection relay 42, sizes of the power source relay 41 and the reverse connection protection relay 42 can be reduced compared with a case where mechanical contact relays are used. In addition, because the directions of the parasitic diodes of the power source relay 41 and the reverse connection protection relay 42 are opposite from each other and electric current in both directions can be cut off, even when a power supply source (i.e., the battery 50 and the capacitors 49 in the present embodiment) is incorrectly connected in reverse polarity, the electronic circuit forming the motor driving device 2 can be protected.

The controller 60 is connected such that the controller 60 is capable of receiving power from between the power source relay 41 and the reverse connection protection relay 42. Specifically, the motor driving device 2 includes the OR circuit portion 57 that receives power y from between the ignition switch 52, which is connected in parallel with the power source relay 41 and the reverse connection protection relay 42, and the inverter portion 20, or from between the power source relay 41 and the reverse connection protection relay 42. In addition, the controller 60 is capable of receiving power through the OR circuit portion 57. Accordingly, even when the ignition switch 52 is turned off by the driver, the power supply to the controller 60 continues if the power source relay 41 is in the on-state. Thus, the controller 60 does not lose the power supply suddenly, and the controller 60 can perform the predetermined control ending process with certainty.

In a case where a pre-driver for driving the motor relay portion 30 and a pre-driver for driving the power source relay 41 are consolidated, when the motor relay portion 30 is cut off, the power source relay 41 is also cut off. Then, if the ignition switch 52 is turned off by the driver, the controller 60 cannot perform the predetermined ending process. Thus, in the present embodiment, not the power source relay 41 but the reverse connection protection relay 42, which is connected between the power source relay 41 and the inverter portion 20, and the motor relay portion 30 are driven by the one second pre-driver circuit 85. In addition, power can be supplied from between the power source relay 41 and the reverse connection protection relay 42 to the controller 60 through the OR circuit portion 57. Thus, even when the motor relay portion 30 and the reverse connection protection relay 42 are turned off at the same time, if the power source relay 41 is in the on-state, the power supply to the controller 60 can be continued until the predetermined ending process ends.

The electric power steering apparatus 1 includes the motor 10 and the motor driving device 2. In a case where the motor driving device 2 is applied to the electric power steering apparatus 1, the driver may feel uncomfortable when the motor 10 is driven unintentionally due to, for example, a failure. In the present embodiment, the motor driving device 2 includes the motor relay portion 30 so that the electrical connection between the inverter portion and the motor 10 is immediately cut off when a failure occurs in the electric power steering apparatus 1. Accordingly, the electric power steering apparatus 1 can restrict the driver from feeling uncomfortable.

In the present embodiment, the controller 60 includes the control section and the failure detection section. The failure detection section performs the processes at S102, S104, S107, S108, and S110.

(Second Embodiment)

Figure 4:
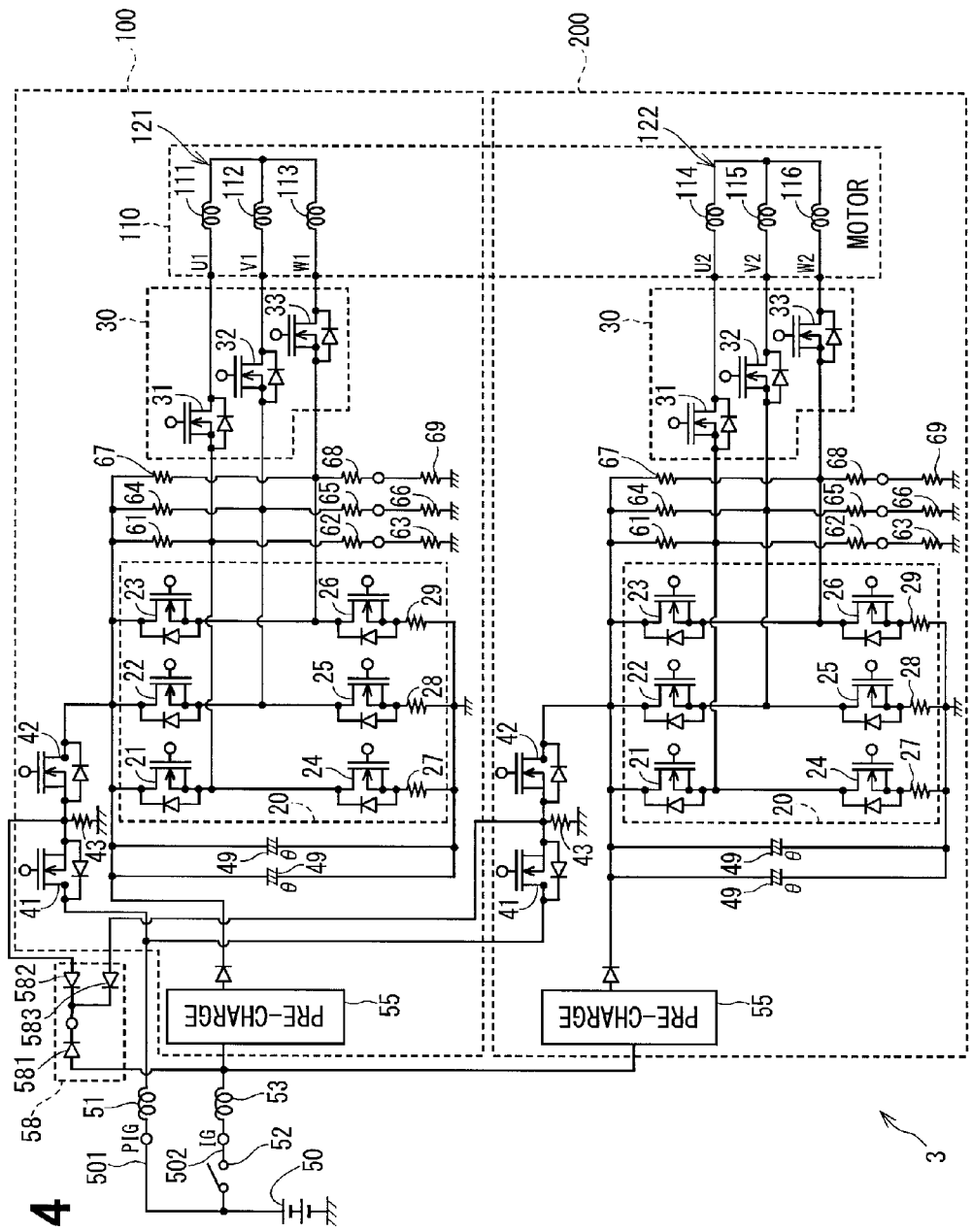
FIG. 4 is a diagram showing a motor driving device according to a second embodiment of the present disclosure.
Figure 5:
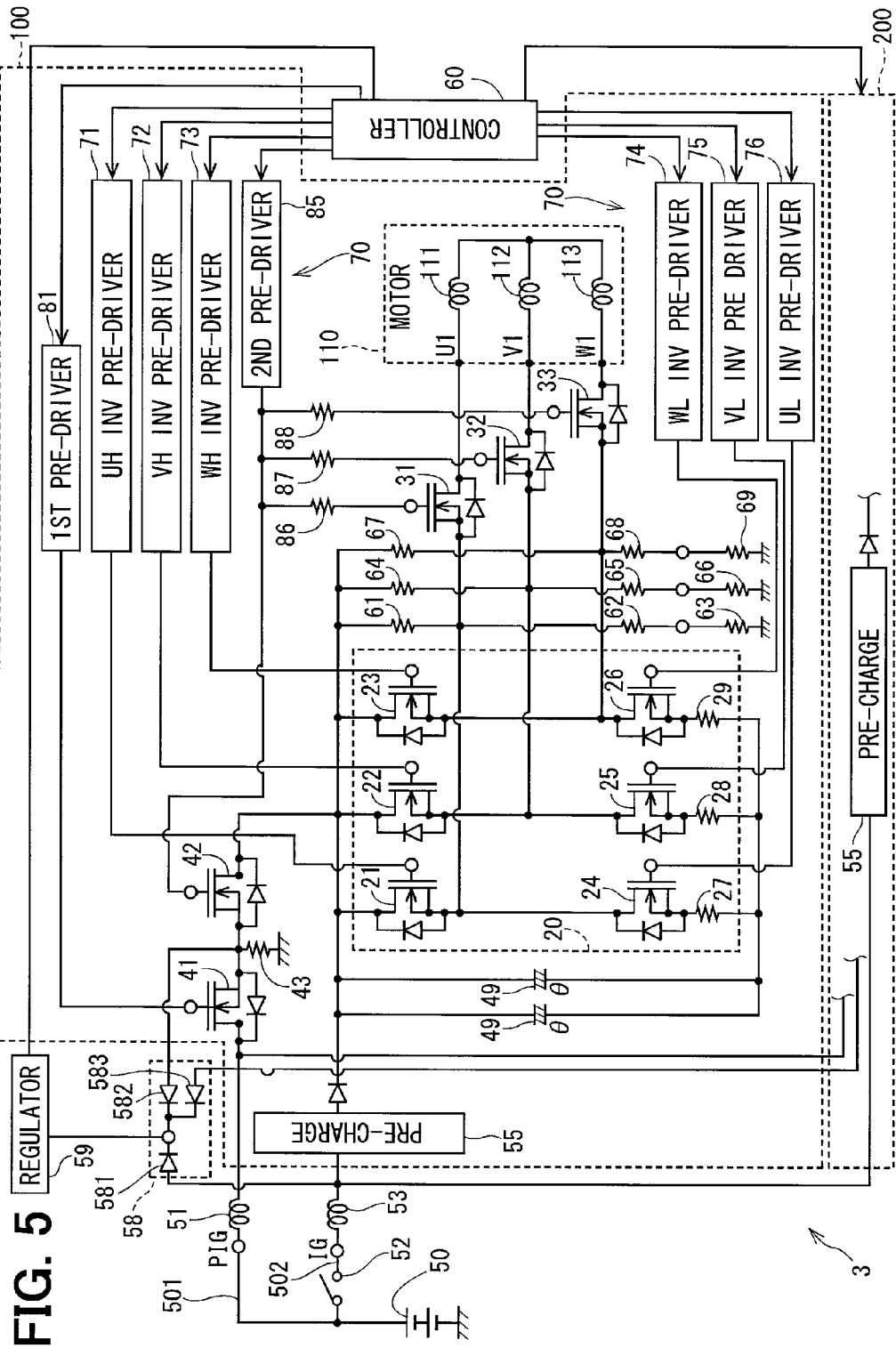
FIG. 5 is a diagram showing the motor driving device according to the second embodiment.

A motor driving device 3 according to a second embodiment of the present disclosure will be described with reference to FIG. 4 and FIG. 5. Components substantially similar to the components of the first embodiment are denoted by the same reference numerals and the description about the components will be omitted. The motor driving device 3 controls driving of the motor 110. The motor 110 includes a first winding group 121 and a second winding group 122. The first winding group 121 includes a U1 coil 111, a V1 coil 112, and a W1 coil 113. The second winding group 122 includes a U2 coil 114, a V2 coil 115, and a W2 coil 116.

With respect to each of the first winding group 121 and the second winding group 122 of the motor 110, the inverter portion 20, the motor relay portion 30, the power source relay 41, the reverse connection protection relay 42, the capacitors 40, the pre-charge circuit 55, the resistors 61-69, 86-88, and the pre-driver circuit portion 70 are provided similarly to the first embodiment. Thus, the motor 110 is driven by a first system 100 that includes the first winding group 121, the corresponding inverter portion 20 and the like and a second system 200 that includes the second winding group 122, the corresponding inverter portion 20 and the like. Accordingly, even when a failure occurs in one of the systems, the motor driving device 3 can continue to drive the motor 110 using the other system without failure, and the electric power steering apparatus 1 can continue to assist the steering operation of the steering wheel 91. It should be noted that the power source relay 41 in the system in which a failure occurs is turned off so that the power is not supplied from the battery 50 to the system in which the failure occurs.

The battery 50, the choke coils 51, 53, the ignition switch 52, the regulator 59, and the controller 60 are shared by the first winding group 121 and the second winding group 122.

An OR circuit portion 58 includes three diodes 581-583. An input terminal of the diode 581 is connected between the choke coil 53 and the pre-charge circuit 55, and an output terminal of the diode 581 is connected to output terminals of the diodes 582, 583. An input terminal of the diode 582 is connected between the power source relay 41 and the reverse connection protection relay 42 provided with respect to the first winding group 121, and the output terminal of the diode 582 is connected to the output terminal of the diode 581. An input terminal of the diode 583 is connected between the power source relay 41 and the reverse connection protection relay 42 provided with respect to the second winding group 122, and the output terminal of the diode 583 is connected to the output terminal of the diode 581. Connection points of the diode 581 and the diodes 582, 583 are connected to the controller 60 through the regulator 59.

Accordingly, even when the ignition switch 52 is turned off by the driver and the power source relay 41 in the system in which a failure occurs is turned off, if at least one of the power source relay 41 in the first system 100 and the power source relay 41 in the second system 200 is in the on-state, the controller 60 can receive power from the PIG line 501 through the controller 60.

As described above, the motor 110 according to the present embodiment includes the first winding group 121 and the second winding group 122. The inverter portion 20, the power source relay 41, the reverse connection protection relay 42, the motor relay portion 30, the inverter pre-driver circuits 71-76, the first pre-driver circuit 81 and the second pre-driver circuit 85 are provided with respect to each of the first winding group 121 and the second winding group 122. When the number of systems for driving the motor 110 is two, the number of required pre-driver circuits doubles. Thus, consolidating the pre-drivers for driving the reverse connection protection relay 42 and the motor relay portion 30 have large effects of reducing the number of pre-driver circuits and reducing a size of the motor driving device 3. In addition, the motor driving device 3 have effects similar to the effects of the motor driving device 2 according to the first embodiment.

(Other Embodiments)

In the above-described embodiments, MOSFETs are used for the switching elements of the inverter portion, the motor relay, the power source relay, and the reverse connection protection relay. In another embodiment, another semiconductor device or a mechanical contact relay may be used. Different types of semiconductor devices or relays may be used for the switching elements of the inverter portion, the motor relay, the power source relay, and the reverse connection protection relay. The parasitic element that is parasitic in the semiconductor device is not limited to a parasitic diode and may be, for example, a parasitic thyristor. In a case where the power source relay and the reverse connection protection relay are mechanical contact relays, the first pre-driver circuit and the second pre-driver circuit may be consolidated into one pre-driver circuit.

In the above-described embodiments, the motor and the motor driving device are one system or two systems. However, in another embodiment, the number of systems may be three. The effects of reducing the number of pre-driver circuits and reducing the size of the motor driving device by consolidating the pre-drivers for driving the second relay portion and the motor relay portion increase with increase in the number of systems.

In the above-described embodiments, the motor driving devices are applied to the electric power steering apparatus. However, in another embodiment, a motor driving device may be applied to an apparatus other than the electric power steering apparatus. While the present disclosure has been described with reference to embodiments thereof, it is to be understood that the disclosure is not limited to the embodiments and constructions. The present disclosure is intended to cover various modifications and equivalent arrangements.

What is claimed is:

1. A motor driving device comprising:
   an inverter portion including a plurality of switching elements that switches power supply to a winding group of a motor;
   a first relay portion connected between a power source and the inverter portion;
   a second relay portion connected between the first relay portion and the inverter portion;
   a motor relay portion connected between the inverter portion and the winding group of the motor;
   a plurality of inverter pre-driver circuits respectively driving the plurality of switching elements of the inverter portion;
   a first pre-driver circuit driving the first relay portion;
   a second pre-driver circuit driving the second relay portion and the motor relay portion; and
   a controller including a control section and a failure detecting section, the control section controlling driving of the inverter portion, the first relay portion, the second relay portion, and the motor relay portion through the plurality of inverter pre-driver circuits, the first pre-driver circuit, or the second pre-driver circuit, the failure detecting section detecting a failure of the first relay portion, the second relay portion, and the motor relay portion.

2. The motor driving device according to claim 1, wherein
   each of the first relay portion and the second relay portion includes a semiconductor device having a parasitic element,
   the first relay portion is a power source relay that is capable of cutting off power supply from the power source to the inverter portion, and
   the second relay portion is a reverse connection protection relay and is connected such that a direction of the parasitic element of the second relay portion is opposite from a direction of the parasitic element of the first relay portion.

3. The motor driving device according to claim 1, wherein
   the controller is connected such that the controller is capable of receiving power from between the first relay portion and the second relay portion.

4. The motor driving device according to claim 3, further comprising
   an OR circuit portion that is capable of receiving power from between the inverter portion and an ignition switch connected in parallel with the first relay portion and the second relay portion, or between the first relay portion and the second relay portion,
   wherein the controller is capable of receiving the power through the OR circuit portion.

5. The motor driving device according to claim 1, wherein
   the motor includes a plurality of the winding groups, and
   the inverter portion, the first relay portion, the second relay portion, the motor relay portion, the inverter pre-driver circuits, the first pre-driver circuit, and the second pre-driver circuit are provided with respect to each of the winding groups.

6. An electric power steering apparatus comprising:
   a motor; and
   the motor driving device according to claim 1.

* * * * *